(12) United States Patent
Miyano et al.

(10) Patent No.: US 7,639,919 B2
(45) Date of Patent: Dec. 29, 2009

(54) SIGNAL PROCESSING SYSTEM, SIGNAL OUTPUTTING DEVICE, SIGNAL INPUTTING DEVICE, AND COMMUNICATION CONTROL METHOD

(75) Inventors: Michio Miyano, Kanagawa (JP); Junji Kato, Tokyo (JP); Makoto Sato, Tokyo (JP); Yuichi Kageyama, Tokyo (JP); Norifumi Kikkawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1103 days.

(21) Appl. No.: 10/268,560

(22) Filed: Oct. 10, 2002

(65) Prior Publication Data

US 2003/0091326 A1    May 15, 2003

(30) Foreign Application Priority Data

Oct. 11, 2001    (JP)    ............... 2001-314143

(51) Int. Cl.
*H04N 7/26*    (2006.01)
*H04N 5/91*    (2006.01)

(52) U.S. Cl. ........................ 386/46; 386/124

(58) Field of Classification Search .................. 386/12, 386/35, 40, 79, 71; 710/5, 38, 61, 69, 305; 348/569
See application file for complete search history.

(56) References Cited

U.S. PATENT DOCUMENTS

| 6,237,028 B1* | 5/2001 | Jackson ..................... 709/214 |
| 6,323,906 B1* | 11/2001 | Kobayashi et al. .......... 348/441 |
| 6,754,226 B1* | 6/2004 | Nakano ..................... 370/466 |
| 6,993,606 B1* | 1/2006 | Takaku et al. ................. 710/61 |
| 7,145,872 B1* | 12/2006 | Kim ........................... 370/230 |
| 7,167,210 B2* | 1/2007 | Seo et al. .................... 348/569 |
| 2001/0007118 A1* | 7/2001 | Matsuda ..................... 710/129 |
| 2001/0011357 A1* | 8/2001 | Mori ........................... 714/25 |
| 2001/0028655 A1* | 10/2001 | Noda et al. ................. 370/402 |

FOREIGN PATENT DOCUMENTS

| JP | 11-275117 | 10/1999 |
| JP | 11-317751 | 11/1999 |

* cited by examiner

*Primary Examiner*—Thai Tran
*Assistant Examiner*—Oluwaseun A Adegeye
(74) *Attorney, Agent, or Firm*—Frommer Lawrence & Haug LLP; William S. Frommer; Paul A. Levy (57) ABSTRACT

When a signal path in a signal outputting device is changed, the signal outputting device indicates signal path change information representing the change in the signal path to a signal inputting device. Based on the signal path change information, the signal inputting device adaptively changes a signal path between the signal outputting device and the signal inputting device. The signal inputting device can know the signal path in the signal outputting device easier than heretofore, and can simply change the signal path between the signal outputting device and the signal inputting device.

10 Claims, 10 Drawing Sheets

FIG. 2

| PRESENT STATUS OF LOGIC CONNECTIONS | | OUTPUT_STATUS OF SIGNAL_SOURCE STATUS RESPONSE | |
|---|---|---|---|
| PtoP CONNECTION | Bin CONNECTION | EFFECTIVE/READY | VIRTUAL OUTPUT |
| NOT ESTABLISHED | NOT ESTABLISHED | ESTABLISH PtoP BETWEEN SPECIFIED oPCR AND ITS OWN iPCR. | ESTABLISH Bin IN A CHANNEL INDICATED BY VIRTUAL OUTPUT. |
| ESTABLISHED | NOT ESTABLISHED | IF INDICATED oPCR IS SAME, DO NOTHING. IF IT IS DIFFERENT oPCR, ESTABLISH PtoP AGAIN. | REMOVE PtoP, AND ESTABLISH Bin IN A CHANNEL INDICATED BY VIRTUAL OUTPUT. |
| NOT ESTABLISHED | ESTABLISHED | RELEASE Bin, AND ESTABLISH PtoP BETWEEN SPECIFIED oPCR AND ITS OWN iPCR | ESTABLISH Bin IN A CHANNEL INDICATED BY VIRTUAL OUTPUT. IF SAME, DO NOTHING |

SIGNAL PROCESSING SYSTEM, SIGNAL OUTPUTTING DEVICE, SIGNAL INPUTTING DEVICE, AND COMMUNICATION CONTROL METHOD

BACKGROUND OF THE INVENTION

The present invention relates to a signal processing system, a signal outputting device, a signal inputting device, and a communication control method, and more particularly to a system for adaptively changing signal paths between a signal outputting device (hereinafter referred to as "source") and a signal inputting device (hereinafter referred to as "sink"), which are connected to a network.

More particularly, the present invention relates to a system for establishing, releasing, and changing signal paths under AV/C Connection and Compatibility Management to transmit signals through isochronous connections specified according to IEC (International Electrotechnical Commission) 61883-1 for sending and receiving isochronous signals between a source and a sink specified according to IEEE (Institute of Electrical Electronics Engineers) 1394.

There have been developed AV (audiovisual) devices capable of transmitting information between a source and a sink via a network using a digital serial bus according to the IEEE 1394.

For operating the network, there are available two modes, i.e., an isochronous transfer mode for transmitting real-time data, and an asynchronous transfer mode for reliably transmitting a control command, etc.

For transmitting real-time data, it is necessary to establish a logic connection as a signal path between a source and a sink.

As the control command, a predetermined command, i.e., an AV/C Command Transaction set (hereinafter referred to as "AV/C command"), is transmitted to control an AV device connected to the network.

Plugs are present at the opposite ends of logic connections. Those plugs include Subunit Plugs for transmitting signals in devices, Plug Control Registers (hereinafter referred to as "PCR") for inputting and outputting digital signals between devices, and External Plugs for inputting and outputting analog signals between devices.

The Subunit Plugs include a Subunit Source Plug for outputting signals and a Subunit Destination Plug for inputting signals. The PCR include an oPCR (Output Plug Control Register) for outputting signals and an iPCR (Input Plug Control Register) for inputting signals. The External Plugs include an External Output Plug for outputting signals and an External Input Plug for inputting signals.

The logic connections include an intra-device connection and an inter-device connection. The intra-device connection indicates a signal path present in each device, and the inter-device connection indicates a signal path present between a source and a sink.

The inter-device connection is available in two types. One type of the inter-device connection is a Point-to-Point connection (hereinafter referred to as "PtoP connection") connecting one oPCR and one iPCR with one isochronous channel.

The other type of the inter-device connection includes a Broadcast out connection (hereinafter referred to as "Bout connection") connecting one oPCR to one isochronous channel and a Broadcast in connection (hereinafter referred to as "Bin connection") connecting one iPCR to one isochronous channel. These two connections are referred to as a Broadcast connection. A procedure for establishing and releasing a logic connection is described in IEC61883-1.

Establishing one inter-device connection requires an isochronous channel (hereinafter referred to as "channel") and an isochronous band (hereinafter referred to as "band"). They are collectively referred to as an isochronous resource (hereinafter referred to as "resource").

For establishing a logic connection, there is specified a command set called AV/C Connection and Compatibility Management (hereinafter referred to as "CCM") as a scheme for transmitting information for appropriately establishing a logic connection by using a control command between a source and a sink.

A scheme for establishing the signal path of a logic connection using the CCM will be described below. An intra-device connection can be established by using a SIGNAL SOURCE command prescribed according to the CCM, and an inter-device connection can be established by using an INPUT SELECT command prescribed according to the CCM.

For the INPUT SELECT command, there are defined four sub functions including CONNECT, PATH CHANGE, SELECT, and DISCONNECT. When the INPUT SELECT command is to be sent, it is necessary to specify one of these sub functions. An example in which a sink acknowledges the INPUT SELECT command (returns an accepted response) will be described below.

The sink that has received CONNECT establishes an inter-device connection with a specified source. A sink that has received PATH CHANGE basically operates in the same manner as the CONNECT sub function, but can deny the establishment of an inter-device connection (returns a rejected response) if a specified source is not selected. A sink that has received SELECT selects a specified source, and can determine whether to establish an inter-device connection or not. A sink that has received DISCONNECT breaks a specified inter-device connection.

According to the CCM, a source sends the INPUT SELECT command to a sink for thereby transmitting information of the source to the sink, and the sink establishes an inter-device connection to the source using the information. To carry out such a process, it is necessary to enable the source to store information of the sink to which the INPUT SELECT command is to be sent. According to the CCM, an OUTPUT PRESET command is available for performing such a function. The INPUT SELECT command is used to enable the sink to store information of the source. Alternatively, an external controller may control the sink to store information of the source or control the source to store information of the sink.

According to the present invention, based on the basic concept of the CCM, an intra-device connection is established by the device itself, and an inter-device connection is established by a sink. However, an intra-device connection may be controlled from outside of the device using the SIGNAL SOURCE command.

For establishing an inter-device connection using the CCM, if a source wants to change an output signal from a digital signal to an analog signal, then the source sends the INPUT SELECT command to a sink. The sink uses information given by the received INPUT SELECT command to change the inter-device connection from a digital connection to an analog connection. The same process is carried out to change the signal path from analog to digital.

In the conventional process using the CCM, for changing the signal path from digital to analog or changing the signal path from analog to digital, the source sends the PATH CHANGE sub function of the INPUT SELECT command to the sink to indicate the signal path change to the sink.

There is a situation in which one of AV devices connected to a network is simultaneously inputting and outputting signals and is directly outputting a signal, which is being inputted from an external circuit. In such a situation, resources are wastefully used because one channel and one band are required for each of the signal input and the signal output.

The CCM introduces a virtual output and a concept called a monitor connection in order to prevent resources from being used excessively. Specifically, if a device that is simultaneously inputting and outputting signals is regarded as a source, then when a signal communicating with the source inspects an oPCR of the source with a status command of the SIGNAL SOURCE, the source returns a virtual output representing the inspected result as a response to the sink. Having received the inspected result, the sink does not establish a PtoP connection between its own iPCR and the oPCR of the source, but establishes a Bin connection to a channel inputted by the source. The form of such a logic connection is referred to as a monitor connection.

For making the above monitor connection in the conventional process using the CCM, it has been customary for the sink to periodically inspect the oPCR of the source using the status command of the SIGNAL SOURCE.

According to another process of making a monitor connection, the sink registers a notify function in the source using a notify command of the SIGNAL SOURCE, and when the status of the oPCR of the source is changed, the sink is notified of the change in the status of the oPCR using the notify function.

In the conventional process using the CCM, the sink that needs to make a monitor connection is required to periodically inspect the oPCR of the source using the status command of the SIGNAL SOURCE or register itself in the source using the notify command of the SIGNAL SOURCE.

If the sink periodically inspects the oPCR of the source using the status command of the SIGNAL SOURCE, then the sink needs to send the status command periodically to know the latest status of the oPCR of the source. The periodical transmission of the status command gives rise to problems in that the traffic on the 1394 bus becomes busy and the source, which receives the command, suffers a burden.

If the sink registers the notify function in the source using the notify command of the SIGNAL SOURCE, then since the sink does not need to send a command periodically to the source, the process is more advantageous than if the sink periodically inspects the oPCR of the source using the status command of the SIGNAL SOURCE. According to this process, however, when the source issues a notify message after the sink has registered the notify function in the source, the registration is canceled, requiring the sink to register the notify function again in the source. When the bus is reset, the registration is also canceled, requiring the sink to register the notify function again in the source.

In addition, as there is no way of canceling the notify function, no solution is available when the notification based on the notify function is no longer necessary. Furthermore, since the notify function is registered with priority given to a subsequent registration, if there are two sinks that register the notify function in a single source, then the sink that has registered the notify function in the source earlier has its registered notify function overwritten by the sink that registers the notify function in the source later, and cannot receive a notify message from the source.

SUMMARY OF THE INVENTION

It is therefore an object of the present invention to provide a signal processing system, a signal outputting device, a signal inputting device, and a communication control method, which makes it possible to know the latest status of signal path information in a source without a sink having to periodically inspect the oPCR of the source using the status command of the SIGNAL SOURCE or having to registering the notify function in the source using the notify command of the SIGNAL SOURCE.

To achieve the above object, there is provided in accordance with the present invention a signal processing system including a network, a signal outputting device connected to the network, and a signal inputting device connected to the network, the signal outputting device having indicating means for indicating signal path change information representing a change in a signal path in the signal outputting device to the signal inputting device when the signal path in the signal outputting device is changed, the signal inputting device having changing means for adaptively changing a signal path between the signal outputting device and the signal inputting device based on the signal path change information. Therefore, the signal inputting device can know the signal path in the signal outputting device easier than heretofore, and can simply change the signal path between the signal outputting device and the signal inputting device.

BRIEF DESCRIPTION OF THE DRAWINGS

These and other objects of the invention will be seen by reference to the description, taken in connection with the accompanying drawing, in which.

DETAILED DESCRIPTION OF THE PREFERRED EMBODIMENTS

Figure 1:
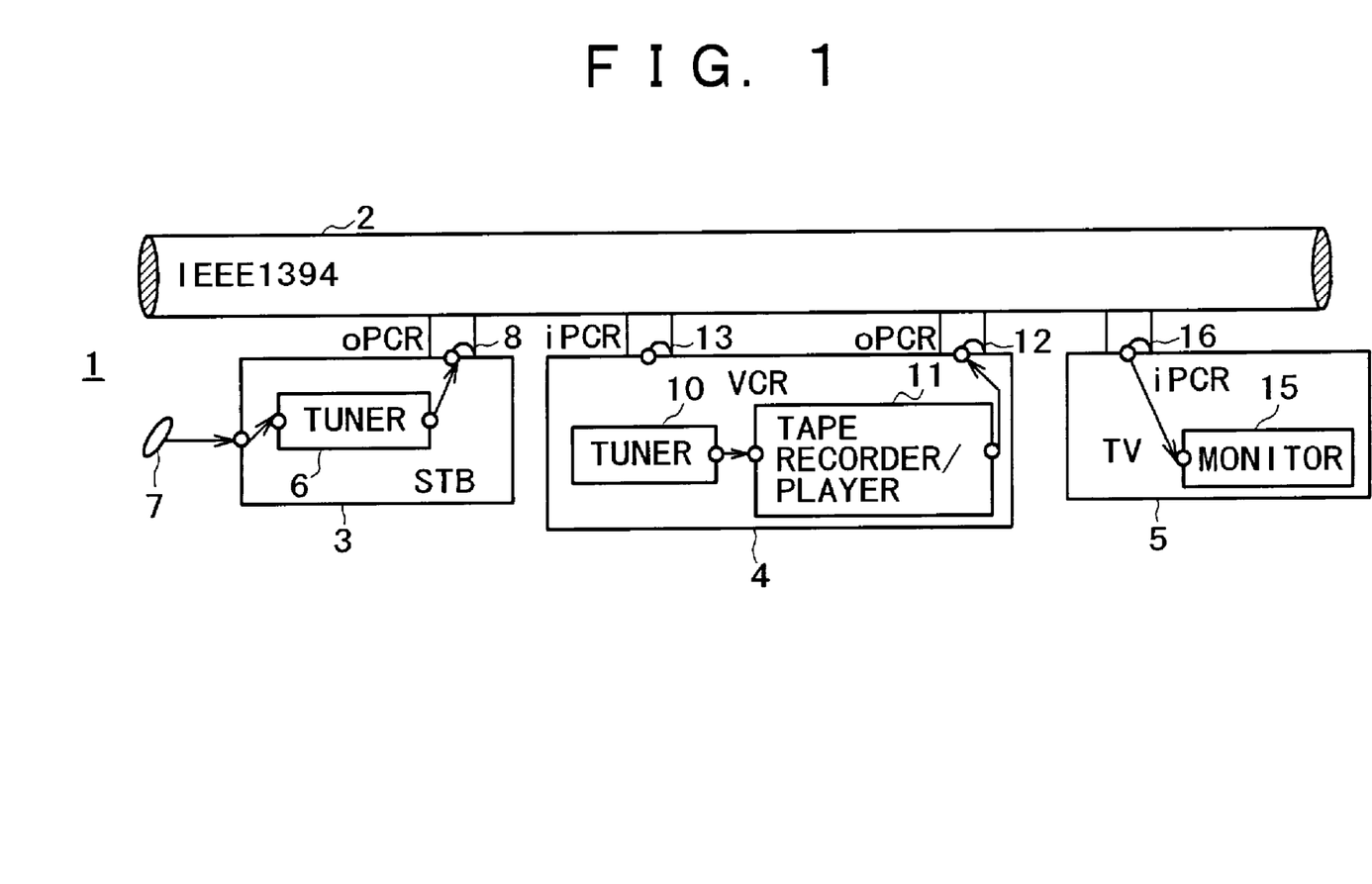
FIG. 1 is a block diagram of a form of a 1394 network according to the present invention.

FIG. 1 shows in block form a 1394 network 1 according to the present invention, which includes an STB (Set Top Box) 3, a VCR (Video Cassette Recorder) 4, and a TV (Television) set 5, which are connected to an IEEE 1394 serial bus 2.

The STB 3 accommodates a tuner 6 therein, and inputs a signal received by an antenna 7 to the tuner 6, and sends a signal, which has been processed by the tuner 6, to an oPCR 8.

The VCR 4 accommodates a tuner 10 and a tape recorder/player 11 therein, and inputs a signal received by an antenna (not shown) to the tuner 10, and sends a signal, which has been processed by the tuner 10, to an oPCR 12 or the tape recorder/player 11.

The tape recorder/player 11 receives a signal supplied from the tuner 10 or an iPCR 13, records the signal, reproduces the recorded signal, and sends the reproduced signal to the oPCR 12. The VCR 4 may send a signal supplied from the iPCR 13 directly to the oPCR 12 for transmission to an external circuit.

The TV set 5 accommodates a monitor 15 therein, and inputs a signal supplied from an iPCR 16 to the monitor 15, which displays an image based on the signal.

In the illustrated embodiment, the VCR 4 serves as a source, and the TV set 5 as a sink. A process in which the sink knows signal path information of the source and changes a signal path will be described below.

According to a device selection application on the TV set 5, a PATH CHANGE of an INPUT SELECT transmitted from the presently selected VCR 4 is allowed to establish and release a logic connection appropriately, and a PATH CHANGE of an INPUT SELECT transmitted from a device other than the VCR 4 is denied. The device selection application and an automatic play application can thus be present together using the same command group.

First, the sink is controlled to store information of the source. Since the device selection application is executed on the sink, the sink stores information of the source by selecting the source. This means that the TV set 5 selects the VCR 4 for the TV set 5 to store information of the VCR 4.

The sink now denies a PATH CHANGE of an INPUT SELECT transmitted from a device other than the source. If a device other than the sink needs to store information of the source, then a SELECT sub function of the INPUT SELECT is used.

Then, the sink registers itself in the source using an OUTPUT PRESET. This means that the TV set 5 sends the OUTPUT PRESET to the VCR 4 for the VCR 4 to store information of the TV set 5.

If the source in which the sink has been registered intends to output a signal, then the source assigns a usable oPCR, sets it as a parameter of the PATH CHANGE of the INPUT SELECT, and sends a command to the sink. The intention of the source to output a signal signifies an effective status in which the source is reproducing a medium or a virtual output status in which the source is directly outputting an input signal.

Generally, if a device is turned off, then it sends a DISCONNECT sub function of the INPUT SELECT. If a device places itself in a virtual output status even when it is turned off, then the device is regarded as being intended to output a signal, and does not send a DISCONNECT sub function of the INPUT SELECT, but sends a PATH CHANGE OF the INPUT SELECT. Sending a PATH CHANGE OF the INPUT SELECT, rather than a DISCONNECT sub function of the INPUT SELECT, is also a feature of the present invention.

The sink, which has received the PATH CHANGE OF the INPUT SELECT, sends a status command of a SIGNAL SOURCE to a plug described in an output plug based on the parameter of the received command to inspect a present status. This is effective particularly when the output plug represents a serial bus oPCR as described later on, but may be executed when the output plug represents an external output plug.

Figure 2:
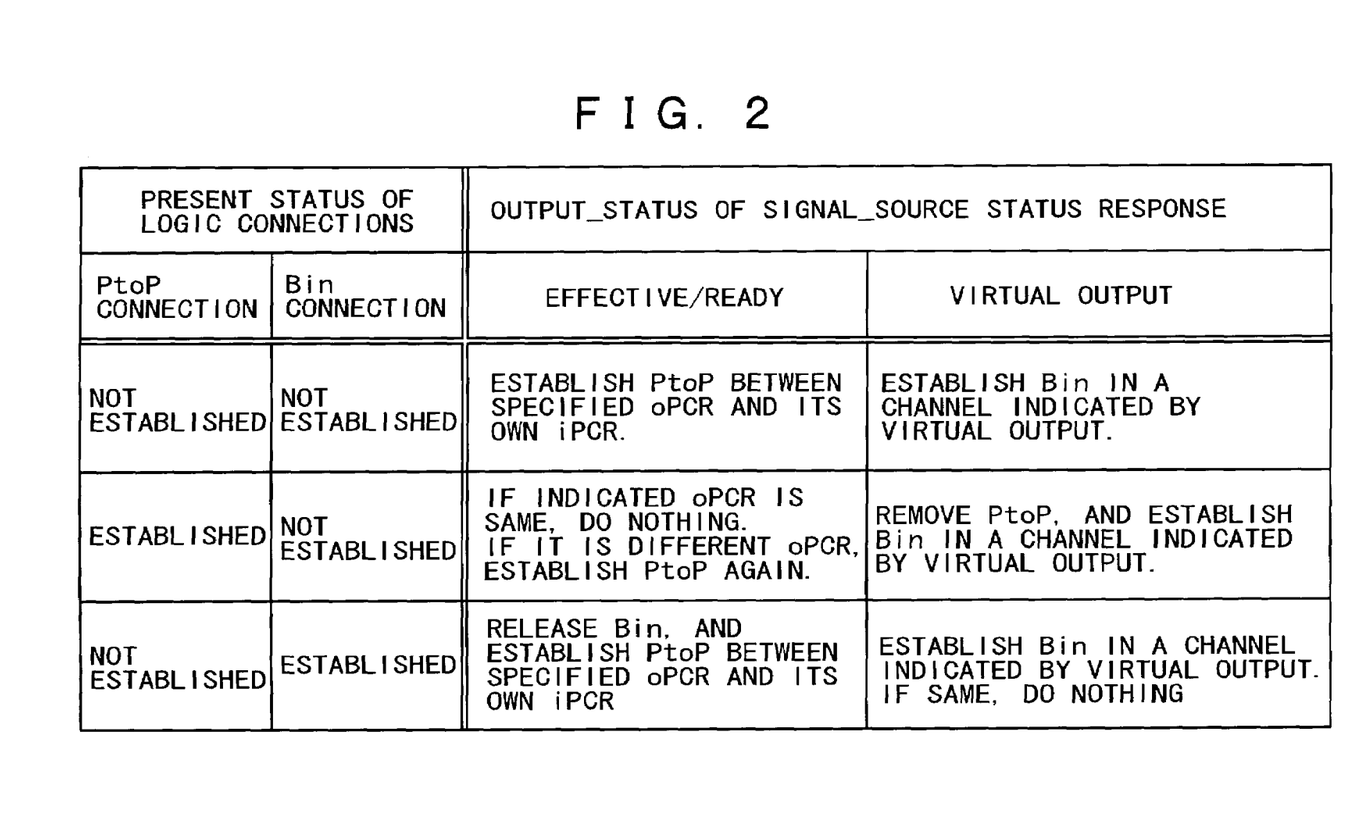
FIG. 2 is a table showing phases of operation of a sink.

An example in which the output plug represents a serial bus oPCR will be described below. FIG. 2 shows phases of operation of the sink as a result of the inspection by the sink with the status command of the SIGNAL SOURCE. The sink operates as shown in FIG. 2 depending on the result (output status) of the inspection by the sink with the status command of the SIGNAL SOURCE and the present status of a logic connection, making it possible to establish an appropriate logic connection.

Figure 3:
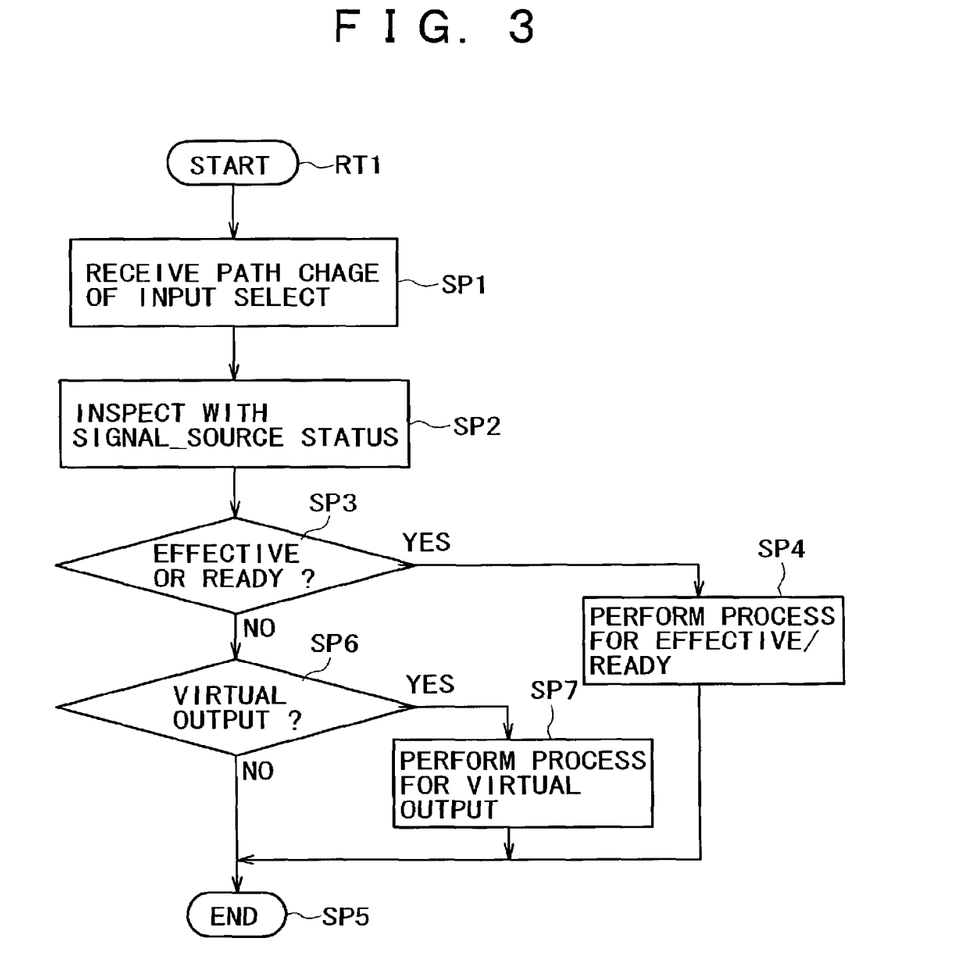
FIG. 3 is a flowchart of an operation sequence of the sink.

The phases of operation of the sink shown in FIG. 2 are illustrated in detail in FIGS. 3 through 9. FIG. 3 shows an operation sequence RT1 of the sink that has received a PATH CHANGE of an INPUT SELECT. When the operation sequence RT1 is started, the sink receives a PATH CHANGE of an INPUT SELECT in step SP1, and then inspects a present status with a status command of a SIGNAL SOURCE in step SP2.

The sink determines whether the present status is an effective or ready state or not in step SP3. If the answer to step SP3 is affirmative, then it means that the present status is the effective or ready state. Control then goes to step SP4 in which the sink carries out a process for the effective or ready state. Thereafter, the operation sequence RT1 is put to an end in step SP5.

If the answer to step SP3 is negative, then it means that the present status is not the effective or ready state. Control then goes to step SP6 in which the sink determines whether the present status is a virtual output status or not.

If the answer to step SP6 is affirmative, then it means that the present status is the virtual output status. Control goes to step SP7 in which the sink carries out a process for the virtual output state. Thereafter, the operation sequence RT1 is put to an end in step SP5.

If the answer to step SP6 is negative, then it means that the source does not intend to output a signal. Control goes to step S5 in which the operation sequence RT1 is put to an end.

Figure 4:
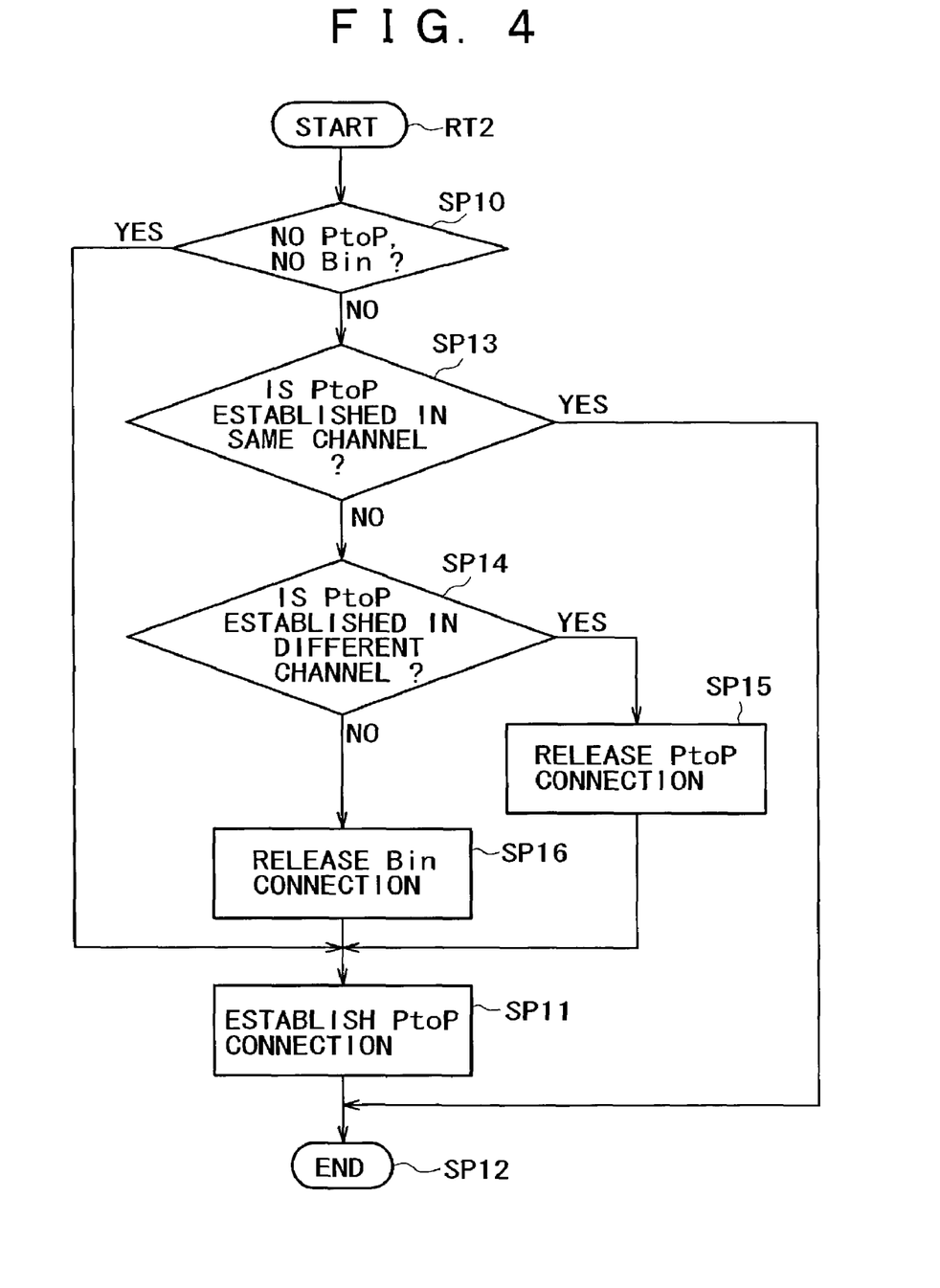
FIG. 4 is a flowchart of a processing sequence of the sink in an effective/ready status.

The processing in step S4, which is carried out by the sink in the effective or ready status, will be described in specific detail with reference to a processing sequence RT2 shown in FIG. 4. When the processing sequence RT2 is started, the sink determines whether neither a PtoP connection nor a Bin connection is established as a present logic connection or not in step SP10.

If the answer to step SP10 is affirmative, then it means that neither a PtoP connection nor a Bin connection is established as a present logic connection. Control jumps to step SP11 in which the sink establishes a PtoP connection. Thereafter, the processing sequence RT2 is put to an end in step SP12.

If the answer to step SP10 is negative, then it means that either a PtoP connection or a Bin connection is established as a present logic connection. Control goes to step SP13 in which the sink determines whether a PtoP connection is established in the same channel as a specified channel or not.

If the answer to step SP13 is affirmative, then it means that a PtoP connection is established in the same channel as a specified channel. Control jumps to step SP12 in which the processing sequence RT2 is put to an end.

If the answer to step SP13 is negative, then it means that a PtoP connection is not established in the same channel as a specified channel. Control goes to step SP14 in which the sink determines whether a PtoP connection is established in a channel different from a specified channel or not.

If the answer to step SP14 is affirmative, then it means that a PtoP connection is established in a channel different from a specified channel. Control goes to step SP15 in which the sink releases the PtoP connection. The sink then establishes a PtoP connection again in step SP11. Thereafter, the processing sequence RT2 is put to an end in step SP12.

If the answer to step SP14 is negative, then it means that a Bin connection is established. Control goes to step SP16 in which the sink releases the Bin connection. The sink then establishes a PtoP connection in step SP11. Thereafter, the processing sequence RT2 is put to an end in step SP12.

Figure 5:
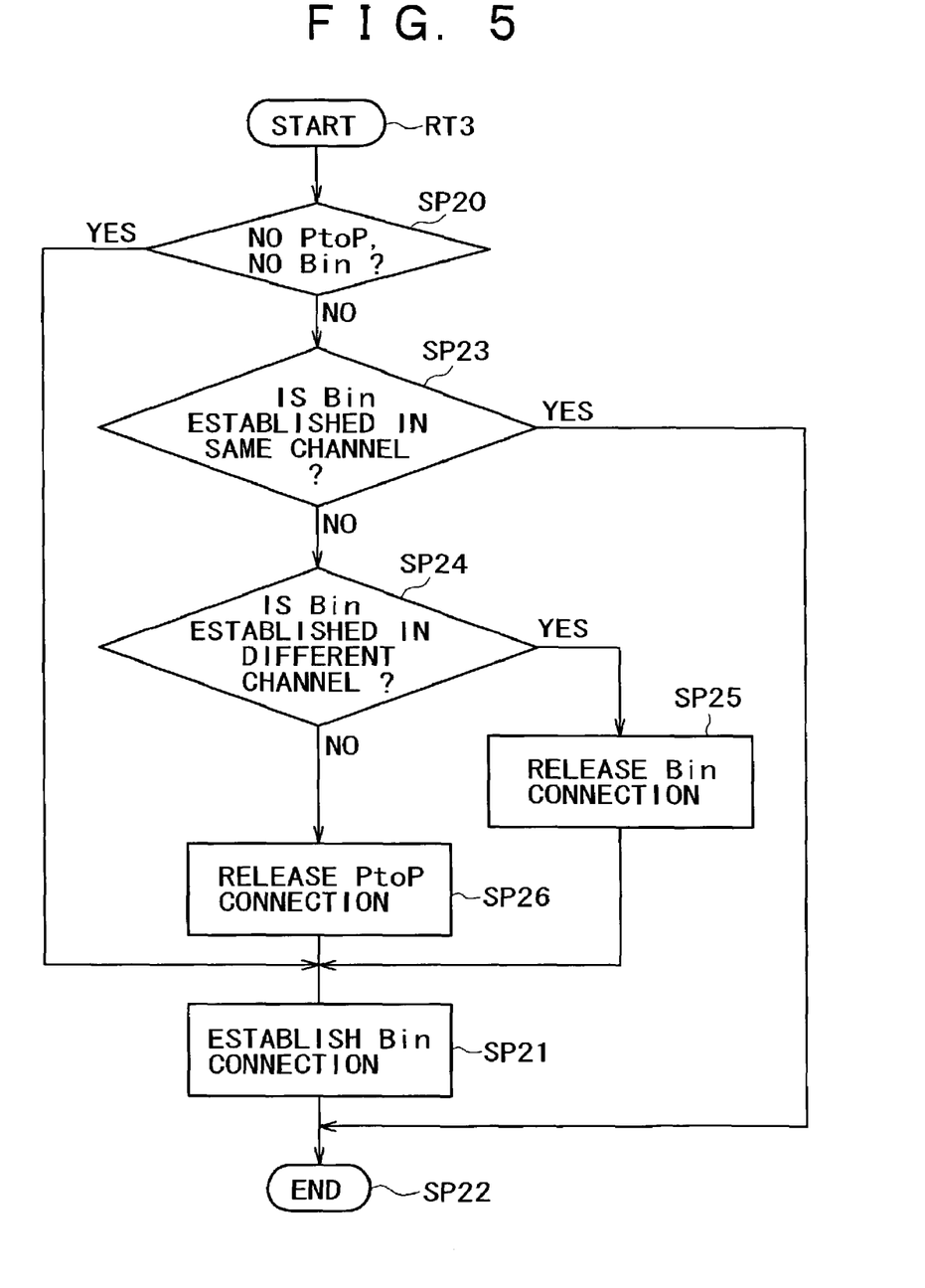
FIG. 5 is a flowchart of a processing sequence of the sink in a virtual output status.

The processing in step S7, which is carried out by the sink in the virtual output status, will be described in specific detail with reference to a processing sequence RT3 shown in FIG. 5. When the processing sequence RT3 is started, the sink determines whether neither a PtoP connection nor a Bin connection is established as a present logic connection or not in step SP20.

If the answer to step SP20 is affirmative, then it means that neither a PtoP connection nor a Bin connection is established as a present logic connection. Control jumps to step SP21 in which the sink establishes a Bin connection. Thereafter, the processing sequence RT3 is put to an end in step SP22.

If the answer to step SP20 is negative, then it means that either a PtoP connection or a Bin connection is established as a present logic connection. Control goes to step SP23 in which the sink determines whether a Bin connection is established in the same channel as a specified channel or not.

If the answer to step SP23 is affirmative, then it means that a Bin connection is established in the same channel as a specified channel. Control jumps to step SP22 in which the processing sequence RT3 is put to an end.

If the answer to step SP23 is negative, then it means that a Bin connection is not established in the same channel as a specified channel. Control goes to step SP24 in which the sink determines whether a Bin connection is established in a channel different from a specified channel or not.

If the answer to step SP24 is affirmative, then it means that a Bin connection is established in a channel different from a specified channel. Control goes to step SP25 in which the sink releases the Bin connection. The sink then establishes a Bin connection again in step SP21. Thereafter, the processing sequence RT3 is put to an end in step SP22.

If the answer to step SP24 is negative, then it means that a PtoP connection is established. Control goes to step SP26 in which the sink releases the PtoP connection. The sink then establishes a Bin connection in step SP21. Thereafter, the processing sequence RT3 is put to an end in step SP22.

Figure 6:
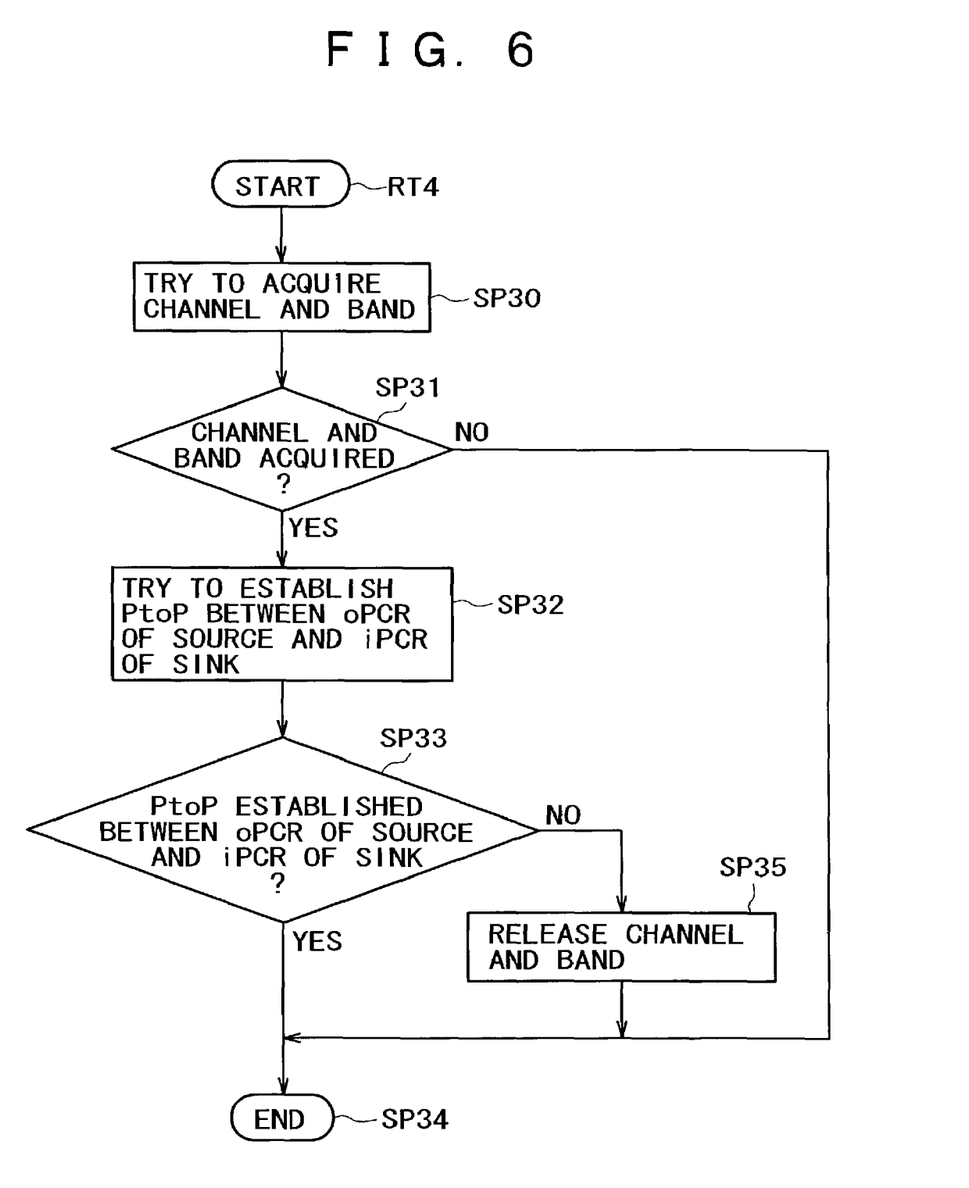
FIG. 6 is a flowchart of a PtoP connection establishing procedure.

The processing in step S11 for establishing a PtoP connection will be described in specific detail with reference to a PtoP connection establishing procedure RT4 shown in FIG. 6. When the PtoP connection establishing procedure RT4 is started, the sink tries to acquire a channel and a band in step SP30.

Then, the sink determines whether it has acquired a channel and a band or not in step SP31. If the answer to step SP31 is affirmative, then it means that the sink has acquired a channel and a band. Control goes to step SP32 in which the sink tries to establish a PtoP connection between an oPCR of the source and an iPCR of the sink.

The sink then determines whether a PtoP connection is established between the oPCR of the source and the iPCR of the sink or not in step SP33. If the answer to step SP33 is affirmative, then it means that the sink is successful in establishing a PtoP connection. Control then goes to step SP34 in which the PtoP connection establishing procedure RT4 is put to an end.

If the answer to step SP33 is negative, then it means that the sink fails to establish a PtoP connection. Control goes to step SP35 in which the sink releases the channel and the band. Thereafter, the PtoP connection establishing procedure RT4 is put to an end in step SP34.

If the answer to step SP31 is negative, then it means that the sink fails to establish a PtoP connection. Thereafter, the PtoP connection establishing procedure RT4 is put to an end in step SP34.

Figure 7:
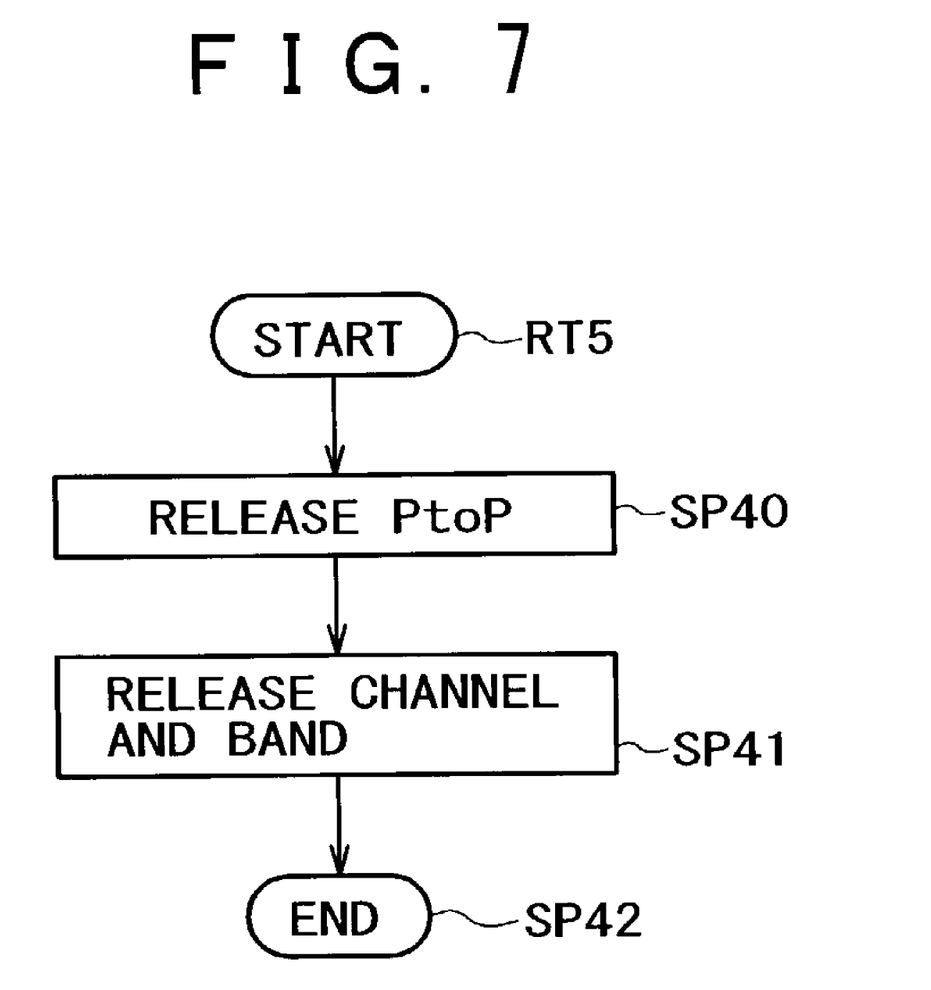
FIG. 7 is a flowchart of a PtoP connection releasing procedure.

The processing in steps SP15 and SP26 for releasing a PtoP connection will be described in specific detail with reference to a PtoP connection releasing procedure RT5 shown in FIG. 7. When the PtoP connection releasing procedure RT5 is started, the sink releases a PtoP connection in step SP40. Then, the sink releases the channel and the band in step SP41. Thereafter, the PtoP connection releasing procedure RT5 is put to an end in step SP42.

Figure 8:
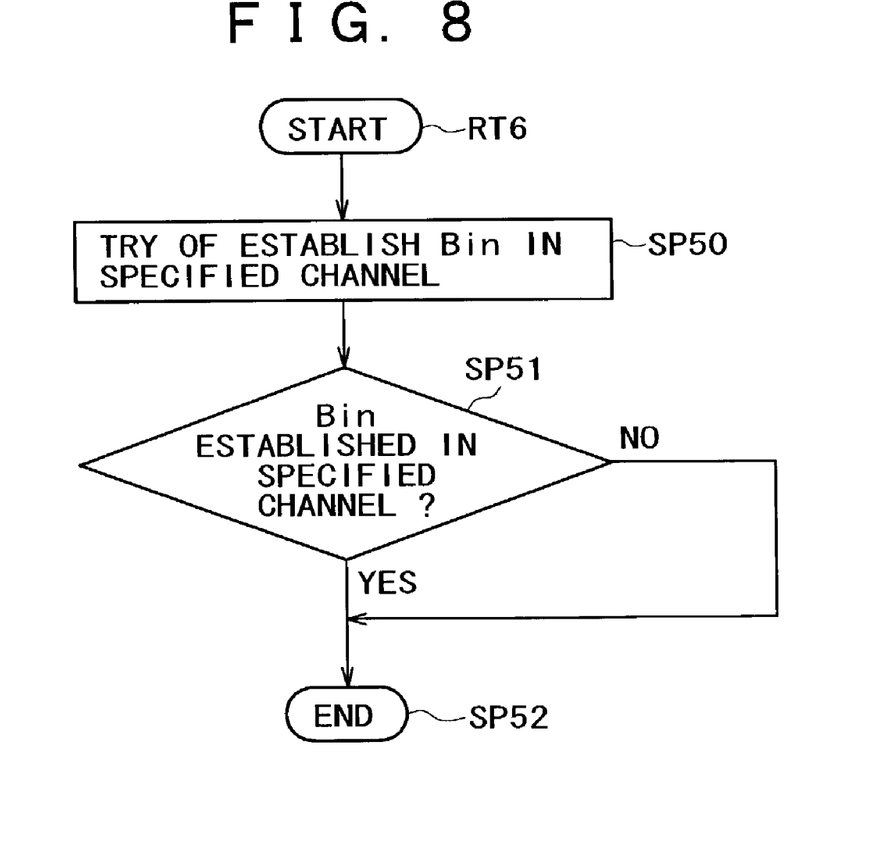
FIG. 8 is a flowchart of a Bin connection establishing procedure.

The processing in step SP21 for establishing a Bin connection will be described in specific detail with reference to a Bin connection establishing procedure RT6 shown in FIG. 8. When the Bin connection establishing procedure RT6 is started, the sink tries to establish a Bin connection in a specified channel in step SP50.

The sink determines whether a Bin connection is established in a specified channel or not in step SP51. If the answer to step SP51 is affirmative, then it means that the sink is successful in establishing a Bin connection. Control then goes to step SP52 in which the Bin connection establishing procedure RT6 is put to an end.

If the answer to step SP51 is negative, then it means that the sink fails to establish a Bin connection. Control goes to step SP52 in which the Bin connection establishing procedure RT6 is put to an end.

Figure 9:
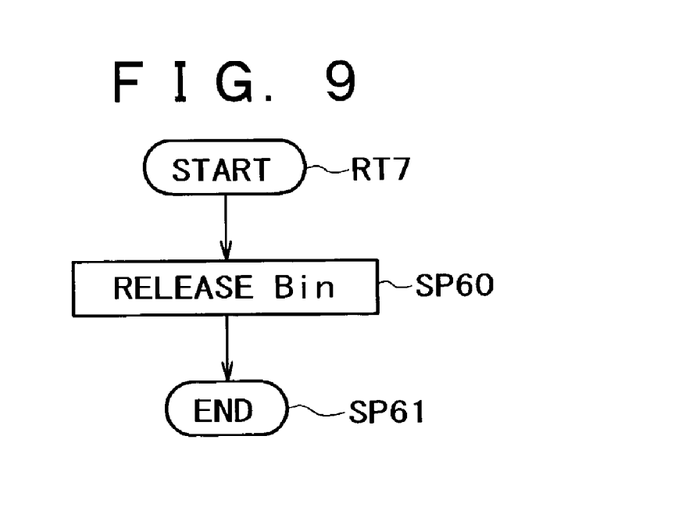
FIG. 9 is a flowchart of a Bin connection releasing procedure.

The processing in steps SP16 and SP25 for releasing a Bin connection will be described in specific detail with reference to a Bin connection releasing procedure RT7 shown in FIG. 9. When the Bin connection releasing procedure RT7 is started, the sink releases a Bin connection in step SP60. Thereafter, the Bin connection releasing procedure RT7 is put to an end in step SP61.

Figure 10:
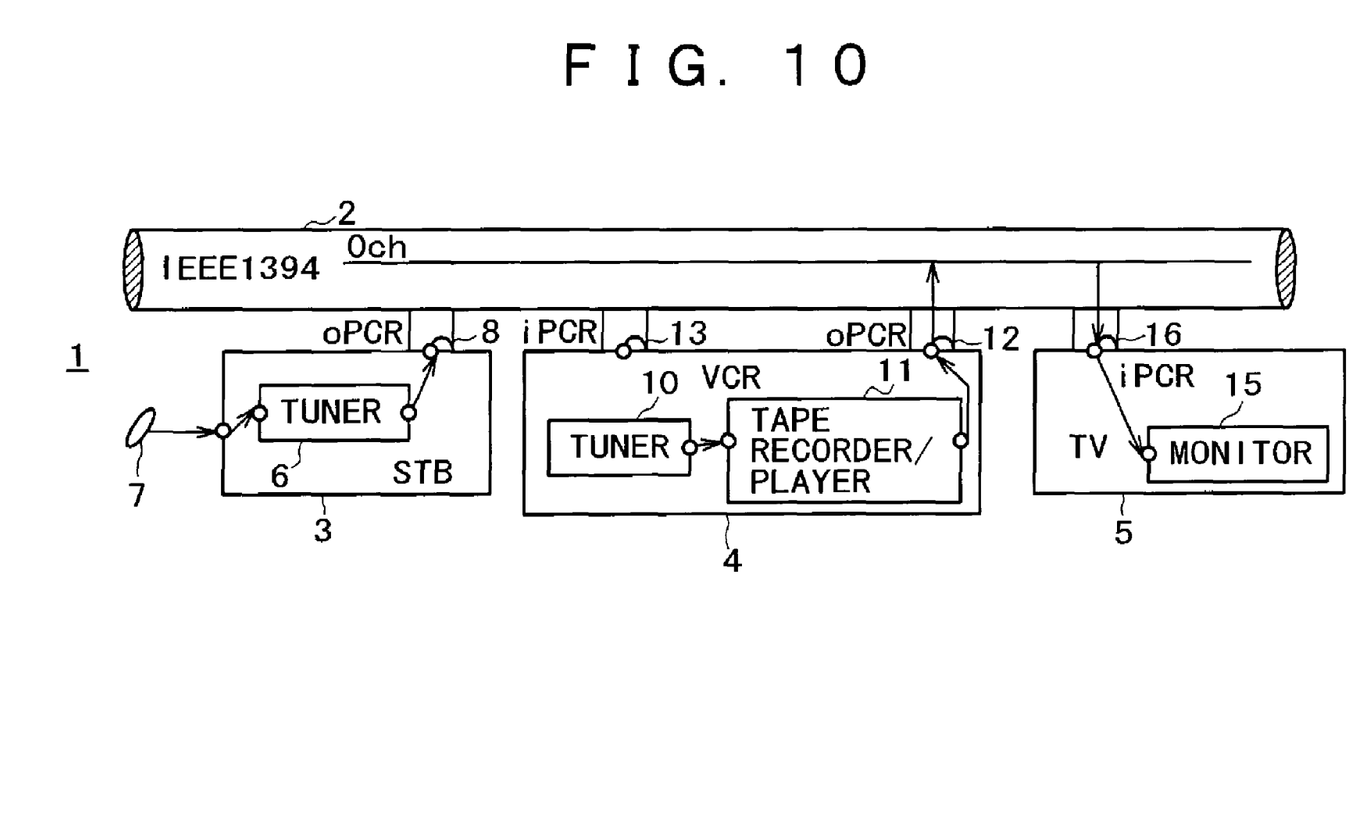
FIG. 10 is a block diagram of an established PtoP connection.
Figure 11:
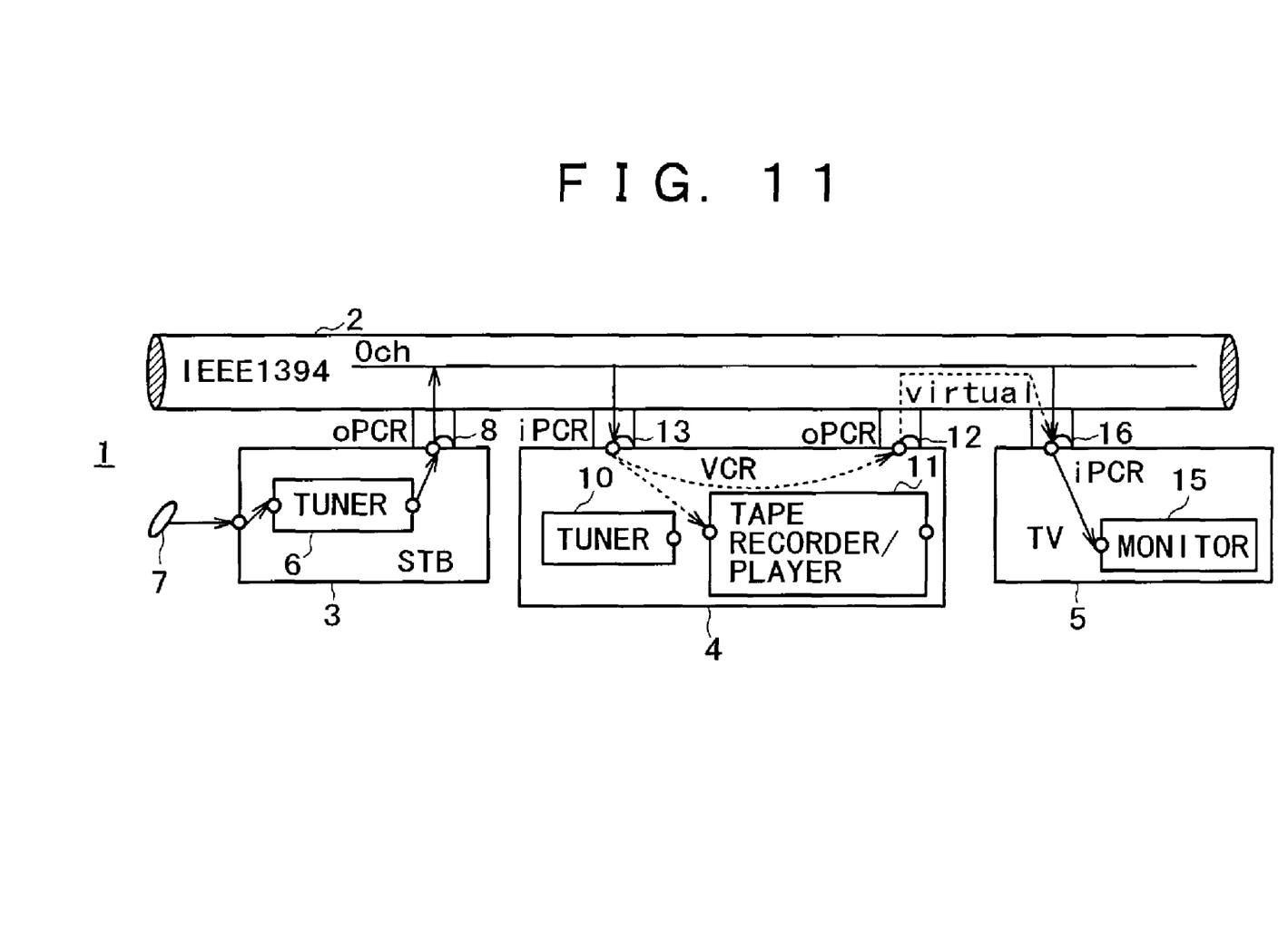
FIG. 11 is a block diagram of an established Bin connection.

FIG. 10 shows in block form an established PtoP connection, and FIG. 11 shows in block form an established Bin connection.

The process of using the PATH CHANGE of the INPUT SELECT according to the present invention is advantageous in that it can be used as it is without disturbing the conventional method of changing the signal path from digital to analog or vice versa. The process is capable of similarly handling a change from any digital plug to a different digital plug or a change from any analog plug to a different analog plug.

In the above arrangement, the source sends a PATH CHANGE sub function of the INPUT SELECT to the sink when signal path information in the source is changed. The sink, which has received the PATH CHANGE sub function from the source, inspects the status of the oPCR of the source using the status command of the SIGNAL SOURCE based on the information given by the INPUT SELECT command. The sink establishes a PtoP connection or a Bin connection based on the result of the inspection.

The sink thus inspects the status of the oPCR of the source only when it receives the PATH CHANGE of the INPUT SELECT, rather than periodically inspecting the status of the oPCR of the source using the status command of the SIGNAL SOURCE.

Therefore, the sink can know the timing to change the signal path without periodically inspecting the status of the oPCR of the source using the status command of the SIGNAL SOURCE. Furthermore, since the sink inspects the status of the oPCR of the source only when it receives the PATH CHANGE of the INPUT SELECT, the traffic on the bus is reduced.

Changing the signal path adaptively results in effective utilization of resources connected to the bus. The present invention is applicable without disturbing the conventional method of using the PATH CHANGE, i.e., the method of changing the signal path from digital to analog. By establishing a Bin connection with the means of the present invention, the user can view signals being outputted from the selected source while following them at all times.

With the above arrangement, the source indicates a present change in the signal path in the source to the sink, and the sink adaptively changes the signal path depending on the indicated change. Therefore, the sink is able to known signal path information in the source easier than heretofore.

In the illustrated embodiment, the present invention is applied to the 1394 network 1. However, the present invention is not limited to the 1394 network 1, but may be applied to a signal processing system constituting a signal outputting device and a signal inputting device, which are connected to a given network.

In the illustrated embodiment, the present invention is applied to the signal outputting device as a source. However, the present invention is not limited to the signal outputting device as a source, but may be applied to any of various other signal outputting devices that, when a signal path therein is changed, sends signal path change information indicative of the signal path change to a signal inputting device.

In the illustrated embodiment, the present invention is applied to the signal inputting device as a sink. However, the present invention is not limited to the signal inputting device as a sink, but may be applied to any of various other signal inputting devices, which adaptively change a signal path between the signal outputting device and the signal inputting device based on signal path change information.

While a preferred embodiment of the invention has been described using specific terms, such description is for illustrative purposes only, and it is to be understood that changes and variations may be made without departing from the spirit or scope of the following claims.

What is claimed is:

1. A signal processing system comprising:
   a network;
   a signal outputting device connected to said network; and
   a signal inputting device connected to said network;
   said signal outputting device having sending means for sending signal path change information representing a change in a signal path in said signal outputting device to said signal inputting device when the signal path in said signal outputting device is changed;
   said signal inputting device having changing means for adaptively changing a signal path between said signal outputting device and said signal inputting device based on said signal path change information, said inputting device further comprising:
     first receiving means for receiving a signal path change information including an output plug information sent from said signal outputting device;
     sending means for sending a request for checking a status of said signal outputting device thereto;
     second receiving means for receiving a result of checking the status of said signal outputting device; and
     said changing means comprises means for adaptively changing the signal path between said signal outputting device and said signal inputting device based on the result of checking the status of said signal outputting device and wherein said changing means comprises means for changing said signal path based on whether a PtoP connection and a Bin connection are established or not,
   wherein when the outputting device is in a virtual output status the outputting device sends the signal path change information to the signal inputting device and does not send a disconnect signal to the signal inputting device.

2. A signal processing system according to claim 1, wherein said network comprises an IEEE 1394 network.

3. A signal outputting device connected to a signal inputting device through a network, comprising:
   sending means for sending signal path change information representing a change in a signal path in said signal outputting device to said signal inputting device when the signal path in said signal outputting device is changed; and
   receiving means for receiving, from the signal inputting device, a request for checking the status of said signal outputting device,
   wherein the signal path change information includes an output plug information of said signal outputting device,
   wherein said changing means comprises means for changing said signal path based on whether a PtoP connection and a Bin connection are established or not,
   wherein when the outputting device is in a virtual output status the outputting device sends the signal path change information to the signal inputting device and does not send a disconnect signal to the signal inputting device.

4. A signal outputting device according to claim 3, wherein said network comprises an IEEE 1394 network.

5. A signal inputting device connected to a signal outputting device through a network, comprising:
   first receiving means for receiving a signal path change information including an output plug information sent from said signal outputting device;
   sending means for sending a request for checking a status of said signal outputting device thereto;
   second receiving means for receiving a result of checking the status of said signal outputting device; and
   changing means for adaptively changing a signal path between said signal outputting device and said signal inputting device based on the result of checking the status of said signal outputting device,
   wherein said changing means comprises means for changing said signal path based on whether a PtoP connection and a Bin connection are established or not,
   wherein when the outputting device is in a virtual output status the outputting device sends the signal path change information to the signal inputting device and does not send a disconnect signal to the signal inputting device.

6. A signal inputting device according to claim 5, further comprising:
   inspecting means for inspecting the signal path in said signal outputting device when said signal path change information is indicated from said signal outputting device:
   said changing means comprising means for adaptively changing the signal path between said signal outputting device and said signal inputting device based on an inspected result from said inspecting means.

7. A signal inputting device according to claim 5, wherein said network comprises an IEEE 1394 network.

8. A method of controlling communications in a signal processing system having a network, a signal outputting device connected to the network, and a signal inputting device connected to the network, comprising the steps of:

sending, from said signal outputting device, signal path change information representing a change in a signal path in said signal outputting device to said signal inputting device when the signal path in said signal outputting device is changed;

receiving, from the signal inputting device, a request for checking the status of said signal outputting device, receiving a signal path change information including an output plug information from said signal outputting device;

sending a request for checking a status of said signal outputting device thereto;

receiving a result of checking the status of said signal outputting device; and adaptively changing a signal path between said signal outputting device and said signal inputting device based on the result of checking the status of said signal outputting device, wherein the signal path change information includes an output plug information of said signal outputting device, wherein said step of adaptively changing the signal path comprises the step of changing said signal path based on whether a PtoP connection and a Bin connection are established or not, wherein when the outputting device is in a virtual output status the outputting device sends the signal path change information to the signal inputting device and does not send a disconnect signal to the signal inputting device.

9. A method according to claim 8, further comprising the step of:

inspecting, with said signal inputting device, the signal path in said signal outputting device when said signal path change information is indicated from said signal outputting device;

said step of adaptively changing the signal path comprises the step of adaptively changing the signal path between said signal outputting device and said signal inputting device based on an inspected result.

10. A method according to claim 8, wherein said network comprises an IEEE 1394 network.

* * * * *

UNITED STATES PATENT AND TRADEMARK OFFICE
CERTIFICATE OF CORRECTION

PATENT NO. : 7,639,919 B2  Page 1 of 1
APPLICATION NO. : 10/268560
DATED : December 29, 2009
INVENTOR(S) : Miyano et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1564 days.

Signed and Sealed this

Ninth Day of November, 2010

David J. Kappos
*Director of the United States Patent and Trademark Office*